(12) United States Patent
Takaki (10) Patent No.: US 10,864,908 B2
(45) Date of Patent: Dec. 15, 2020

(54) VEHICLE CONTROL DEVICE AND VEHICLE CONTROL METHOD

(71) Applicant: DENSO CORPORATION, Kariya (JP)

(72) Inventor: Ryo Takaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 145 days.

(21) Appl. No.: 16/086,161

(22) PCT Filed: Feb. 22, 2017

(86) PCT No.: PCT/JP2017/006663
§ 371 (c)(1),
(2) Date: Sep. 18, 2018

(87) PCT Pub. No.: WO2017/163737
PCT Pub. Date: Sep. 28, 2017

(65) Prior Publication Data
US 2019/0106101 A1   Apr. 11, 2019

(30) Foreign Application Priority Data

Mar. 22, 2016   (JP) .................. 2016-057507

(51) Int. Cl.
*B60W 30/09*  (2012.01)
*G08G 1/16*  (2006.01)
(Continued)

(52) U.S. Cl.
CPC ............... *B60W 30/09* (2013.01); *B60T 7/12* (2013.01); *B60T 7/22* (2013.01); *B60T 8/17* (2013.01);
(Continued)

(58) Field of Classification Search
CPC .... B60W 30/09; B60W 40/068; B60W 40/04; B60W 40/105; B60W 2554/804;
(Continued)

(56) References Cited

U.S. PATENT DOCUMENTS

| 2002/0091479 A1* | 7/2002 | Maruko ................. B60T 7/22 701/96 |
| 2014/0032094 A1* | 1/2014 | Heinrichs-Bartscher ................... B60W 50/0097 701/301 |

(Continued)

FOREIGN PATENT DOCUMENTS

| JP | S62-119672 U | 7/1987 |
| JP | 2005-128656 A | 5/2005 |
| JP | 2005-138656 A | 6/2005 |

*Primary Examiner* — Marthe Y Marc-Coleman
(74) *Attorney, Agent, or Firm* — Maschoff Brennan (57) ABSTRACT

A vehicle control ECU calculates an absolute velocity of an object from a vehicle velocity and a relative velocity of the object, and performs collision avoidance control with respect to the object based on the calculated absolute velocity. The vehicle control ECU includes a brake determination unit that determines whether a brake device in the vehicle has been activating in a period during which the absolute velocity is calculated, and a calculation unit that, after the activation of the brake device, calculates a current value of the vehicle velocity based on a previous value of the vehicle velocity and an assumed deceleration amount determined from an assumed activation amount that can be generated by the brake device.

9 Claims, 7 Drawing Sheets

(51) Int. Cl.
  *B60T 7/22* (2006.01)
  *B60T 8/172* (2006.01)
  *B60W 40/068* (2012.01)
  *B60T 7/12* (2006.01)
  *B60W 40/105* (2012.01)
  *B60T 8/17* (2006.01)
  *B60W 40/04* (2006.01)
  *B60R 21/0134* (2006.01)

(52) U.S. Cl.
  CPC ............. *B60T 8/172* (2013.01); *B60W 40/04* (2013.01); *B60W 40/068* (2013.01); *B60W 40/105* (2013.01); *G08G 1/16* (2013.01); *B60R 21/0134* (2013.01); *B60T 2201/022* (2013.01); *B60T 2210/12* (2013.01); *B60T 2210/36* (2013.01); *B60W 2552/40* (2020.02); *B60W 2554/804* (2020.02)

(58) Field of Classification Search
  CPC ......... B60W 2552/40; B60W 2720/103; B60T 7/22; B60T 8/17; B60T 8/172; B60T 8/12; B60T 2210/12; B60T 2210/36; B60T 2201/022; G08G 1/16; G08G 1/166
  USPC .......................................................... 701/70
  See application file for complete search history.

(56) References Cited

U.S. PATENT DOCUMENTS

2015/0183431 A1* 7/2015 Nanami .............. B60W 30/095
                                                            701/301
2015/0239472 A1* 8/2015 Sudou .................. B60W 40/04
                                                            702/96

* cited by examiner

VEHICLE CONTROL DEVICE AND VEHICLE CONTROL METHOD

CROSS-REFERENCE TO RELATED APPLICATION

This patent application is a national stage application under 35 U.S.C. § 371(c) of PCT Application No. PCT/JP2017/006663, filed on Feb. 22, 2017, which claims priority to Japanese Patent Application No. 2016-057507 filed on Mar. 22, 2016 in the Japan Patent Office, the entire disclosure of which is incorporated herein by reference.

TECHNICAL FIELD

The present disclosure relates to a vehicle control device that performs collision avoidance control of a subject vehicle to an object, and a vehicle control method.

Background Art

There is known a device that determines whether an object in front of the subject vehicle is a target of collision avoidance control based on the absolute velocity of the object. This device acquires the relative velocity of the object using a detection device such as a radar sensor included in the subject vehicle, and calculates the absolute velocity using the relative velocity and the subject vehicle velocity. In addition, the device compares the calculated absolute velocity with a determination threshold to determine whether the object is in a moving state as a target of collision avoidance control.

With a long distance from the object to the subject vehicle, the detected absolute velocity of the object may have a large error. Accordingly, PTL 1 discloses a device that changes the determination threshold for determining the absolute velocity according to the distance from the object to the subject vehicle.

CITATION LIST

Patent Literature

[PTL 1] JP 2015-155878 A

SUMMARY OF THE INVENTION

When the determination threshold is changed to handle the error in the absolute velocity as disclosed in PTL 1, there may occur some occasions where the determination threshold is changed even though the absolute velocity has no error in actuality, thereby making it impossible to perform appropriate collision avoidance control.

The present disclosure has been conceived to solve the aforementioned problem. An object of the present disclosure is to provide a vehicle control device that can perform appropriate collision avoidance control based on the absolute velocity of an object, and a vehicle control method.

To solve the foregoing problem, the vehicle control device according to the present disclosure calculates an absolute velocity of an object from a subject vehicle velocity and a relative velocity of the object, and performs collision avoidance control with respect to the object based on the calculated absolute velocity. The vehicle control device includes: a brake determination unit that determines whether a brake device in the subject vehicle has been activated in a period during which the absolute velocity is calculated; and a calculation unit that, after the activation of the brake device, calculates a current value of the subject vehicle velocity based on a previous value of the subject vehicle velocity and an assumed deceleration amount determined from an assumed activation amount that can be generated by the brake device.

The activation of the brake device may cause a large error in the absolute velocity acquired by the vehicle control device. For example, when the brake device is activated, the wheels may become locked so that the subject vehicle velocity may be detected as low, or the change of velocity may become large so that the subject vehicle velocity may not be appropriately detected due to a delay in filtering operation. Change in the vehicle velocity due to the activation of the brake device is considered to be caused by an activation assumed amount of the brake device. Thus, in the vehicle control device according to the present disclosure, the current value of the subject vehicle velocity is calculated based on the previous value of the subject vehicle velocity and the assumed deceleration amount determined by the assumed activation amount (assumed braking force) generated by the brake device. Accordingly, when the brake device is activated, the subject vehicle velocity is calculated based on the previous value and the assumed deceleration amount, and the absolute velocity is calculated from the calculated subject vehicle velocity. Then, collision avoidance control is performed with respect to the object based on the absolute velocity, thereby achieving appropriate collision avoidance control.

BRIEF DESCRIPTION OF THE DRAWINGS

The foregoing and other objects, features, and advantages of the present disclosure will be more clarified by the following detailed description with reference to the attached drawings.

DESCRIPTION OF EMBODIMENTS

Embodiments of a vehicle control device and a vehicle control method according to the present disclosure will be described below with reference to the drawings. In the embodiments described below, components identical or equivalent to each other are given the same reference signs and descriptions of the components with the same reference signs are incorporated by reference.

First Embodiment

Figure 1:
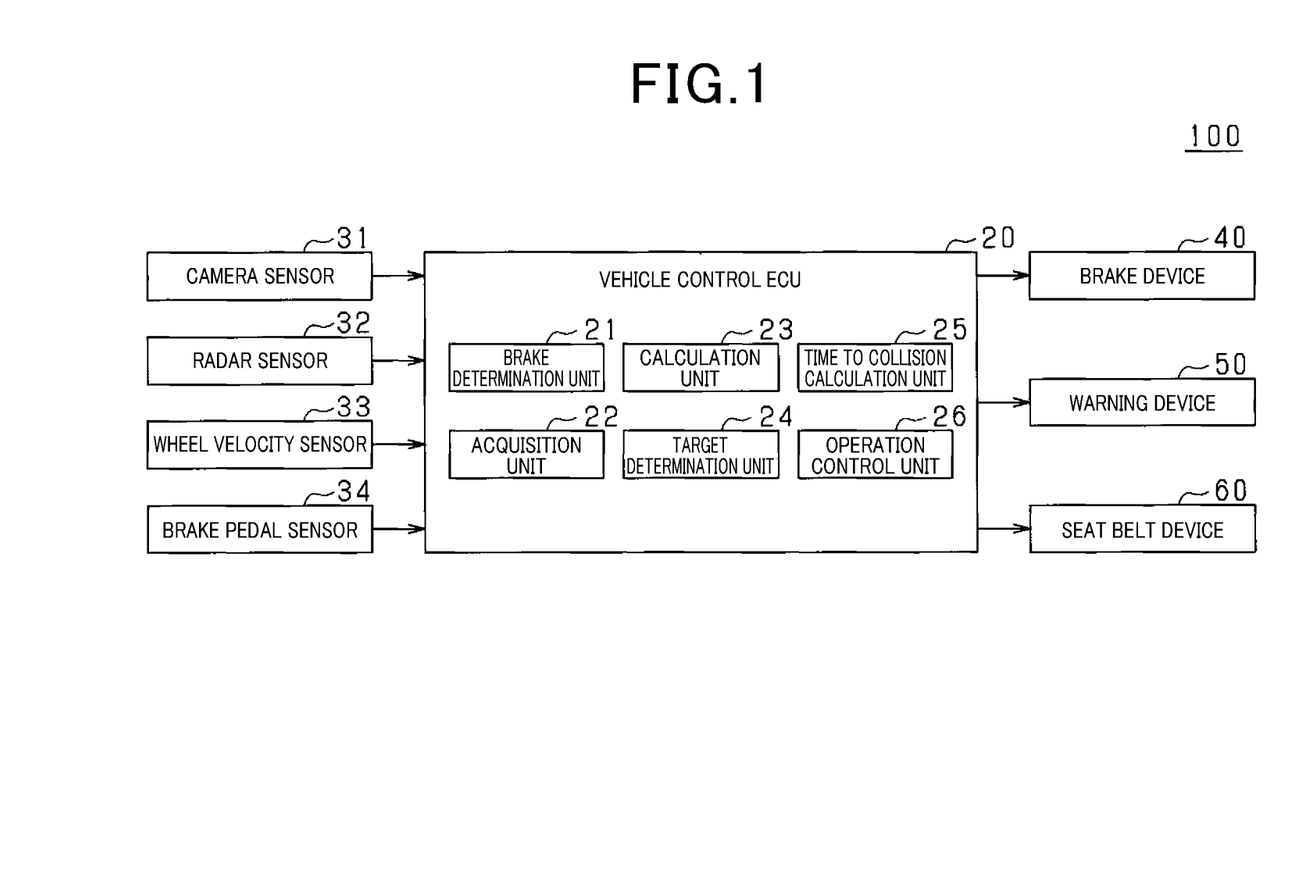
FIG. 1 is a diagram illustrating a PCSS.

FIG. 1 illustrates a pre-crash safety system (hereinafter, called PCSS) 100 to which a vehicle control device and a vehicle control method are applied. The PCSS 100 is an example of a vehicle system mounted in a vehicle, for example. The PCSS 100 detects an object in front of the vehicle. When there is a risk of a collision between the detected object and the vehicle, the PCSS 100 performs a process of avoiding a collision of the subject vehicle with the object or mitigating such a collision. In the following description, the vehicle equipped with the PCS will be referred to as subject vehicle CS and the object as a target of detection by the PCS will be referred to as target object Ob.

As illustrated in FIG. 1, the PCSS 100 includes various sensors, a vehicle control ECU 20, a brake device 40, a warning device 50, and a seat belt device 60. In the embodiment illustrated in FIG. 1, the vehicle control ECU 20 functions as a vehicle control device.

Various sensors are connected to the vehicle control ECU 20 to output detection results of the target object Ob and the subject vehicle CS to the vehicle control ECU 20. Referring to FIG. 1, the various sensors include a camera sensor 31, a radar sensor 32, a wheel velocity sensor 33, and a brake pedal sensor 34. The various sensors output the detection results to the vehicle control ECU 20 at predetermined time intervals.

The camera sensor 31 captures an image of the area in front of the subject vehicle CS and detects a specific object in the captured image. The camera sensor 31 is a device including a monocular camera or a stereo camera such as a CCD image sensor, a CMOS image sensor, or a near infrared sensor, for example. The camera sensor 31 is installed near the upper side and the widthwise center of the windshield of the subject vehicle CS, for example.

The radar sensor 32 transmits a transmitted wave such as a millimeter wave to the target object Ob, for example, and acquires a relative distance Dr between the subject vehicle CS and the target object Ob based on a reflected wave generated by the reflection of the transmitted wave on the target object Ob, and a relative velocity Vr.

The wheel velocity sensor 33 outputs a signal according to an angular velocity $\omega$ of wheels of the subject vehicle CS. The wheel velocity sensor 33 is a non-contact sensor arranged on each of the front and rear wheels of the subject vehicle CS, for example, which detects changes in a magnetic field caused by the rotor rotating together with the wheels. The vehicle control ECU 20 can acquire the subject vehicle velocity Vs by acquiring the average of the outputs from the wheel velocity sensors 33 included in the wheels.

The brake pedal sensor 34 detects the amount of depression of a brake pedal by the driver. Note that, in the present embodiment, the brake pedal is not illustrated.

The vehicle control ECU 20 is formed as a known computer including a CPU, ROM, RAM, and the like not illustrated. The vehicle control ECU 20 executes programs stored in the ROM to function as a brake determination unit 21, an acquisition unit 22, a calculation unit 23, a target determination unit 24, a time to collision calculation unit 25, and an operation control unit 26.

The brake determination unit 21 determines whether the brake device 40 has been activated. In the first embodiment, when acquiring the absolute velocity Va of the target object Ob, the brake determination unit 21 determines whether automatic braking has been executed. For example, the brake determination unit 21 determines whether automatic braking has been executed based on whether the vehicle control ECU 20 has generated a brake request flag for requesting the brake device 40 to execute automatic braking.

The acquisition unit 22 acquires frictional force FF of the road surface on which the subject vehicle CS is running. For example, the acquisition unit 22 acquires the frictional force FF of the road surface based on slip ratio indicating the amount of slippage of the wheels in the rotational direction. The slip ratio is calculated by the following equation (1) based on an estimated vehicle velocity Ve of the subject vehicle CS, the angular velocity $\omega$ of the wheels acquired by the wheel velocity sensors 33, and a wheel radius R:

$$\text{Slip ratio} = (Ve - R\omega)/Ve \qquad (1)$$

For example, the estimated vehicle velocity Ve is acquired based on the number of rotations (angular velocity) of the transmission to which the power from the engine as drive unit is transferred. The angular velocity $\omega$ is acquired based on the average value of the numbers of rotation of the wheels detected by the wheel velocity sensors 33.

After the activation of the brake device 40, the calculation unit 23 calculates the current value of the subject vehicle velocity Vs based on the previous value of the subject vehicle velocity Vs and an assumed deceleration amount determined based on an assumed activation amount that can be generated by the brake device 40. The assumed activation amount is an assumed braking force. The assumed activation amount indicates the braking amount (braking force) generated by the brake device 40, which is determined based on the maximum braking amount of the brake device 40 in the first embodiment. The assumed deceleration amount indicates the assumed value of reduction amount of the subject vehicle velocity Vs caused by the activation of the brake device 40, which is set as guard value Thg in the first embodiment.

The target determination unit 24 uses the absolute velocity Va of the target object Ob to determine whether the target object Ob is a target of the PCS. The target determination unit 24 calculates the absolute velocity Va of the target object Ob by using the subject vehicle velocity Vs and the relative velocity Vr of the target object Ob. Then, the target determination unit 24 determines the state of relative movement of the target object Ob to the subject vehicle CS based on the calculated absolute velocity Va to determine whether the target object Ob is a target of the PCS.

The vehicle control ECU 20 calculates the absolute velocity Va of the target object Ob using the following equation (2):

$$\text{Absolute velocity } Va = \text{relative velocity } Vr + \text{subject vehicle velocity } Vs \qquad (2)$$

Each of the velocities has a positive direction opposite to the traveling direction of the subject vehicle CS.

Figure 2:
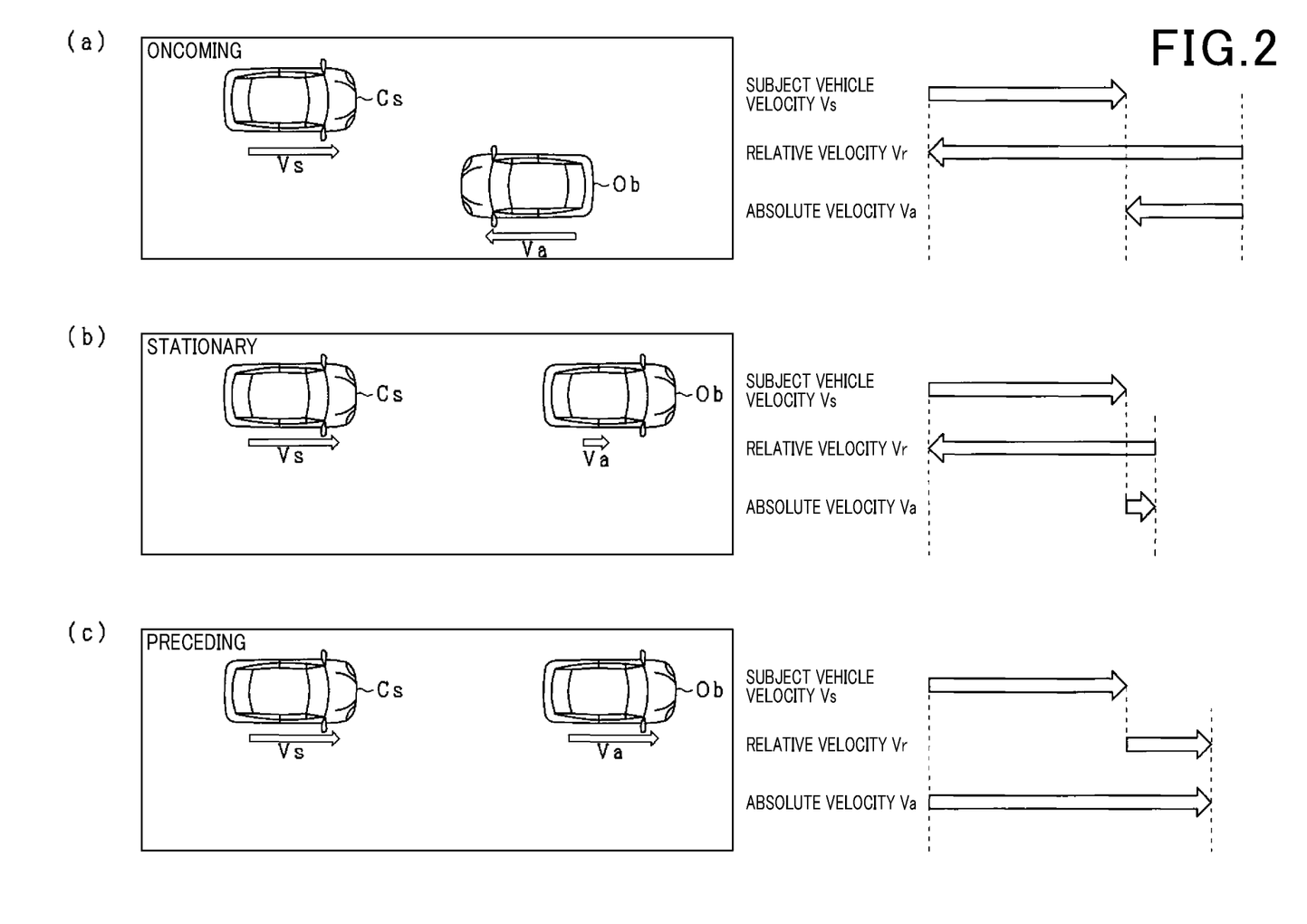
FIG. 2 is a diagram describing relative movement states of a target object Ob.

As illustrated in FIG. 2, the vehicle control ECU 20 determines that the relative movement state of the target object Ob is "oncoming", "stationary", or "preceding" using the absolute velocity Va of the target object Ob. The oncoming state refers to a state where the traveling direction of the target object Ob is opposite to the traveling direction of the subject vehicle CS (that is, the sign of the velocity is reverse) and the absolute velocity Va is equal to or higher than a predetermined velocity (threshold Td1) (see FIG. 2(*a*)), The stationary state refers to a state where the traveling direction of the target object Ob is identical or opposite to the traveling direction of the subject vehicle CS and the absolute velocity Va is lower than predetermined velocities (thresholds Td1 and Td2) (see FIG. 2(*b*)). These thresholds have a relationship of Td1>Td2. The preceding state refers to a state where the traveling direction of the target object is identical to the traveling direction of the subject vehicle CS and the absolute velocity Va is equal to or higher than the predetermined velocity (threshold Td2) (see FIG. 2(c)).

When it is determined that the target object Ob is a target of the PCS, the time to collision calculation unit 25 calculates the time to collision (TTC) indicating the time before the target object Ob collides with the subject vehicle CS. For example, the time to collision calculation unit 25 calculates the TTC using the following equation (3) from the relative distance Dr acquired by the radar sensor 32 and the relative velocity Vr of the target object Ob:

$$TTC=Dr/Vr \quad (3)$$

The operation control unit 26 performs various operations of the PCS based on the calculated TTC. The operation control unit 26 operates the brake device 40, the warning device 50, and the seat belt device 60 according to the calculated TTC to execute the PCS.

Figure 3:
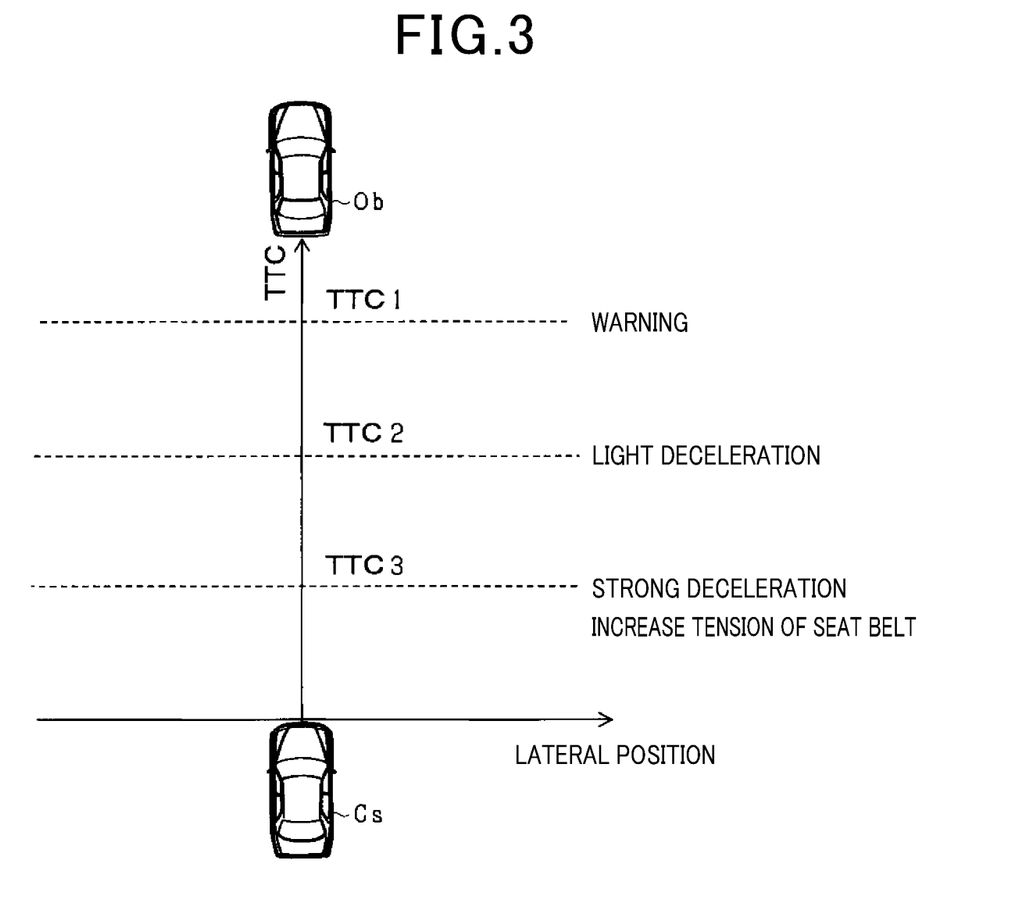
FIG. 3 is a diagram illustrating the types of collision avoidance operations performed by a subject vehicle CS at individual TTCs.

FIG. 3 illustrates the timings for the operations of the PCS with the TTC on the vertical axis and the lateral position on the lateral axis with respect to the subject vehicle CS. The TTC decreases closer to a position of the subject vehicle CS on the vertical axis, which means that the time before the target object Ob collides with the subject vehicle CS is shorter. For example, in the first embodiment, at a TTC 1, the operation control unit 26 controls the warning device 50 to warn the driver about the presence of the target object Ob in the traveling direction. At a TTC 2, the operation control unit 26 controls the brake device 40 to execute automatic braking to gently decelerate (lightly decelerate) the subject vehicle CS by a predetermined amount. At a TTC 3, the operation control unit 26 decelerates the subject vehicle CS by the brake device 40 and performs tensioning control to increase the tension of the seat belt device 60. In this case, at the TTC 3, the operation control unit 26 strongly decelerates the subject vehicle CS by a deceleration amount greater than that at the TTC 2.

Returning to FIG. 1, the brake device 40 includes a brake mechanism that changes the braking force to the subject vehicle CS and a brake ECU that controls the operation of the brake mechanism. The brake ECU is communicably connected to the vehicle control ECU 20 to control the brake mechanism under control of the vehicle control ECU 20. The brake mechanism includes, for example, a master cylinder, a wheel cylinder applying braking force to the wheels, and an ABS actuator that adjusts distribution of pressure (hydraulic pressure) from the master cylinder to the wheel cylinder. The ABS actuator is connected to the brake ECU to regulate the hydraulic pressure from the master cylinder to the wheel cylinder under control of the brake ECU, thereby to adjust the activation amount to the wheels.

The warning device 50 warns the driver about the presence of the target object Ob in front of the subject vehicle CS under control of the vehicle control ECU 20. The warning device 50 is formed from a speaker provided in the cabin and a display unit displaying images, for example.

The seat belt device 60 changes the amount of winding of the seat belt under control of the vehicle control ECU 20 to change the tension of the seat belt.

Figure 4:
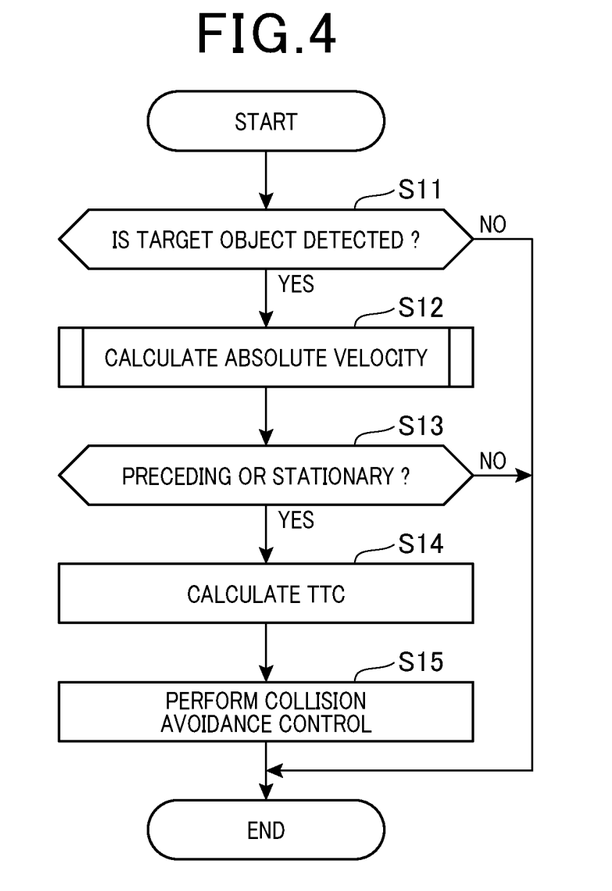
FIG. 4 is a flowchart of collision avoidance control performed by the PCSS.

Next, the collision avoidance control performed by the PCSS 100 will be described with reference to FIG. 4. The vehicle control ECU 20 performs the collision avoidance control illustrated in FIG. 4 at preset time intervals (for example, about 50 [ms]). In the following description, the collision avoidance control currently performed by the vehicle control ECU 20 will also be called "current process", and the collision avoidance control having been performed earlier (for example, 50 [ms] ago) will also be called "previous process".

First, in step S11, the vehicle control ECU 20 detects and determines the target object Ob. The vehicle control ECU 20 detects the target object Ob in front of the subject vehicle CS by the camera sensor 31 or the radar sensor 32 to acquire the positional information of the detected target object Ob.

When having detected the target object Ob (step S11: YES), the vehicle control ECU 2C) calculates the absolute velocity Va of the target object Ob in step S12. At the time of acquisition of the absolute velocity Va in step S12, the vehicle control ECU 20 calculates the current value of the subject vehicle velocity Vs for acquiring the absolute velocity Va using the previous value of the subject vehicle velocity Vs and the guard value Thg. The details of step S12 will be provided later.

When determining in step S13 from the absolute velocity Va calculated in step S12 that the relative movement state of the target object Ob is "preceding" or "stationary" (step S13: YES), the process proceeds to step S14. In step S14, the vehicle control ECU 20 calculates the TTC with the target object Ob. When determining in step S13 that the relative movement state is "oncoming", the vehicle control ECU 20 terminates the process.

In step S15, the vehicle control ECU 20 performs operations related to collision avoidance control based on the TTC calculated in step S14. When the TTC has arrived to any of the times when the operations illustrated in FIG. 3 are to be performed, the vehicle control ECU 20 performs the applicable operation. When the TTC has not arrived to any of the times when the operations are to be performed, the vehicle control ECU 20 terminates temporarily the process illustrated in FIG. 4 without performing any operation.

Next, a method for calculating the absolute velocity Va described in step S12 of FIG. 4 will be described with reference to FIG. 5. In step S20, the vehicle control ECU 20 acquires the relative velocity Vr of the target object Ob according to the output from the radar sensor 32. In step S21, the vehicle control ECU 20 acquires the subject vehicle velocity Vs according to the outputs from the wheel velocity sensors 33.

In step S22, the vehicle control ECU 20 acquires the frictional force FF of the road surface on which the subject vehicle CS is currently running. Specifically, the vehicle control ECU 20 calculates the slip ratio of the road surface on which the subject vehicle CS is running using the foregoing equation (1) and acquires the frictional force FF based on the calculated slip ratio.

In step S23, the vehicle control ECU 20 determines whether the automatic brake has been activated. For example, the vehicle control ECU 20 determines whether automatic braking has been activated based on whether the brake device 40 is requested to execute automatic braking. Besides, the vehicle control ECU 20 may determine whether automatic braking is currently executed based on the TTC. Step S23 functions as a brake determination step.

When it is not determined in step S23 that automatic braking has been activated (step S23: NO), the vehicle control ECU 20 stores in step S28 the subject vehicle velocity Vs acquired in step S21.

When it is determined in step S23 that automatic braking has been activated (step S23: YES), the vehicle control ECU 20 calculates in step S24 a change amount ΔV indicating a change in velocity at a predetermined time from the difference between the previous value and the current value of the subject vehicle velocity Vs. The previous value refers to the subject vehicle velocity Vs stored by the vehicle control ECU 20 in step S28.

In step S25, the vehicle control ECU 20 acquires the guard value Thg indicating the assumed deceleration amount of the subject vehicle CS at a predetermined time. In the first embodiment, the guard value Thg is set not only by the maximum braking amount of the brake device 40 but also by the frictional three FF of the road surface acquired in step S22. Step S25 functions as a setting unit.

Figure 6:
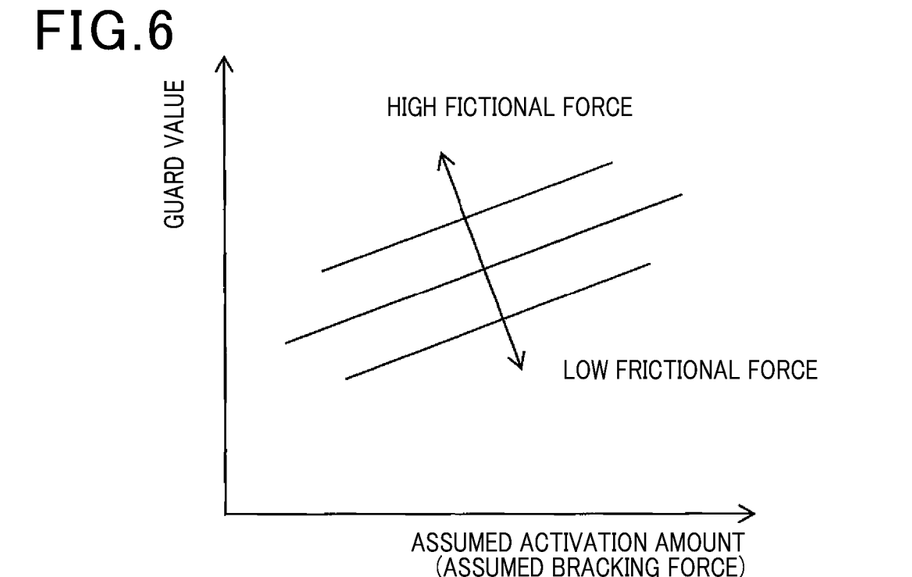
FIG. 6 is a diagram describing a guard value Thg.

FIG. 6 indicates the guard value Thg set by the vehicle control ECU 20. Referring to FIG. 6, the guard value Thg becomes higher as the assumed activation amount of the brake device 40 has a larger value. In addition, the guard value Thg becomes higher as the frictional force FF acquired in step S22 becomes greater because the wheels are less likely to slip with increase in the frictional force FF. For example, the vehicle control ECU 20 stores a map indicative of the relationship illustrated in FIG. 6, and reads the guard value Thg from the map according to step S25.

Returning to FIG. 5, in step S26, the vehicle control ECU 20 determines the change amount ΔV acquired in step S24 using the guard value Thg acquired in step S25. The amount of decrease in the subject vehicle velocity in the period during which the brake device 40 is activated has a smaller value than the guard value Thg defined by the assumed activation amount of the brake device 40. Accordingly, when the change amount ΔV as the amount of decrease in the subject vehicle velocity Vs per unit time exceeds the guard value Thg, there is a high probability that the subject vehicle velocity Vs was wrongly detected in step S21.

Figure 7:
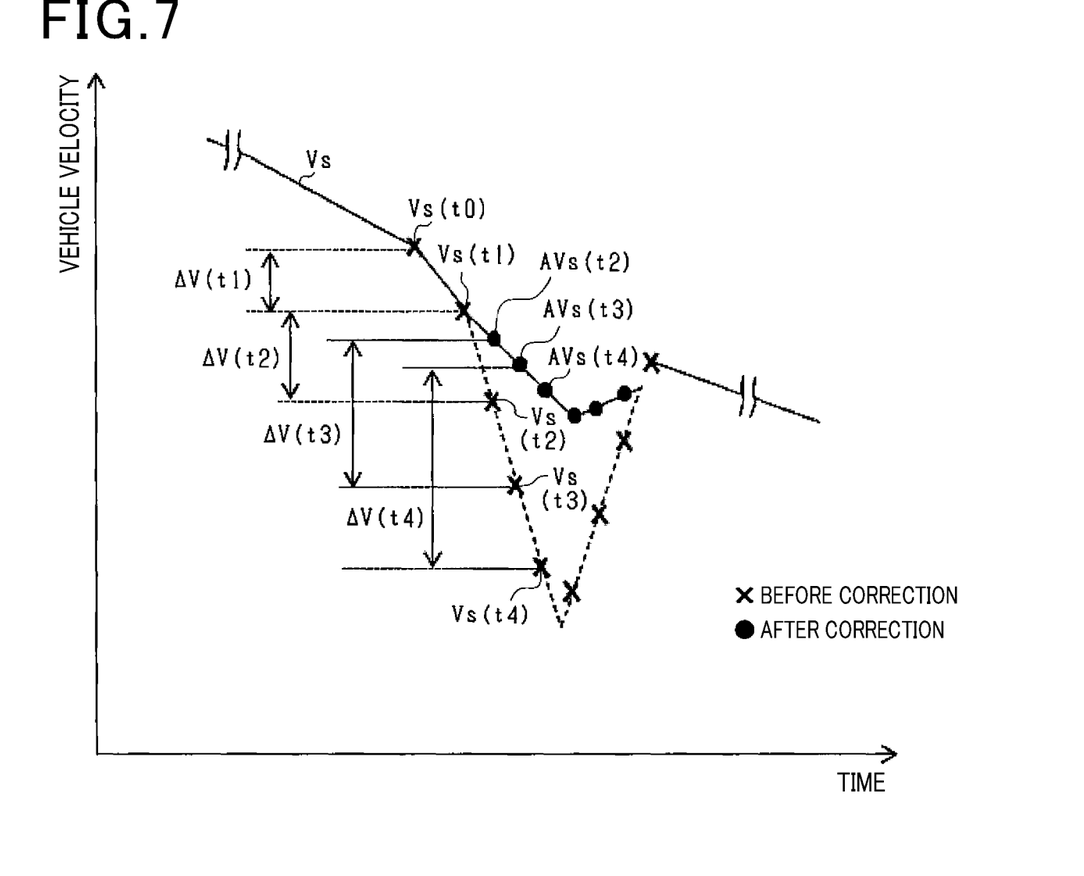
FIG. 7 is a diagram describing corrections to a subject vehicle velocity Vs performed by a vehicle control ECU.

FIG. 7 illustrates the subject vehicle velocities Vs before correction and the subject vehicle velocities Vs after correction acquired based on the outputs from the wheel velocity sensors 33 at times t1 to t4. FIG. 7 illustrates the subject vehicle velocities after correction as AVs for the sake of convenience.

When the change amount ΔV is less than guard value Thg (step S26: NO), there is a low probability that the subject vehicle velocity Vs was wrongly detected, and thus the process proceeds to step S28 to store the subject vehicle velocity Vs acquired in step S21. As an example, as illustrated in FIG. 7, at time t1, the change amount ΔV (t1) as difference between the previous value Vs (t0) of the subject vehicle velocity Vs before correction and the current value Vs (t1) of the subject vehicle velocity Vs before correction falls under the guard value Thg, and thus the vehicle control ECU 20 stores the subject vehicle velocity Vs (t1) before correction in step S28. Therefore, the subject vehicle velocity Vs (t1) before correction stored in step S28 constitutes the previous value for use in step S24 in the next-time process.

On the other hand, when the change amount ΔV is equal to or higher than the guard value Thg (step S26: YES), there is a high probability that the subject vehicle velocity Vs was wrongly detected, and thus, in step S27, the vehicle control ECU 20 corrects the subject vehicle velocity Vs acquired in step S21. The vehicle control ECU 20 corrects the subject vehicle velocity Vs using the following equation (4):

$$AVs(n)=Vs(n-1)-Thg \qquad (4)$$

where n denotes an identifier for differentiating time t.

Referring to FIG. 7, the change amount ΔV (t2) of the subject vehicle velocity Vs at time t2 is acquired as difference between the previous value Vs (t1) and the current value Vs (t2). Referring to FIG. 7, the change amount ΔV (t2) is higher than the guard value Thg, and thus the vehicle control ECU 20 corrects the subject vehicle velocity Vs (t2) using the foregoing equation (4), Steps S26 and S27 function as calculation steps.

When having corrected the subject vehicle velocity Vs in step S27, the vehicle control ECU 20 stores the subject vehicle ΔVs after correction in step S28. Accordingly, the subject vehicle ΔVs (t2) after correction stored in step S28 constitutes the previous value for use in step S24 in the next process. Setting the subject vehicle velocity ΔVs after correction as the previous value makes it possible to substitute the subject vehicle velocity Vs after correction into the foregoing equation (4) at the time of correction of the subject vehicle velocity Vs in step S27 to calculate the current value, thereby enhancing the correction accuracy of the subject vehicle velocity Vs.

In step S29, the vehicle control ECU 20 uses the subject vehicle velocity Vs stored in step S28 and the relative velocity Vr acquired in step S20 to acquire the absolute velocity Va of the target object Ob. Then, in step S13 of FIG. 4, the vehicle control ECU 20 determines the target object Ob using the calculated absolute velocity Va.

As described above, in the first embodiment, at the activation of the automatic brake, the vehicle control ECU 20 may cause wheel locking and a delay in filtering operation for calculating the subject vehicle velocity Vs, thereby resulting in a sudden decrease of the subject vehicle velocity Vs detected by the vehicle control ECU 20. In this period, when the subject vehicle velocity Vs is not corrected, the amount of decrease in the subject vehicle velocity Vs per unit time becomes large. For example, in the case where the movement state of the target object Ob is judged as "stationary", when the absolute velocity Va of the target object Ob exceeds temporarily the threshold Td1, the movement state of the target object Ob is then judged as "oncoming", and thus the target object Ob may be excluded from a target of the PCS.

On the other hand, in the first embodiment, even if the subject vehicle velocity Vs suddenly decreases during execution of automatic braking, the subject vehicle velocity Vs can be corrected to perform appropriate the PCS on the target object Ob. Specifically, when the change amount ΔV of the subject vehicle velocity Vs exceeds the guard value Thg, the subject vehicle velocity Vs is corrected based on the guard value Thg. In the above-mentioned example, the absolute velocity Va acquired from the subject vehicle velocity Vs after correction and the relative velocity Vr is kept between the threshold Td1 and the threshold Td2, and the movement state of the target object Ob is judged as "stationary". Accordingly, the PCS is appropriately performed on the target object Ob.

When the brake device 40 is activated, the current subject vehicle velocity Vs is calculated according to the previous subject vehicle velocity Vs and the guard value Thg, and then the absolute velocity Va is calculated from the calculated subject vehicle velocity Vs, which makes it possible to perform appropriate collision avoidance control with the absolute velocity Va.

The subject vehicle velocity Vs decreases due to the assumed activation amount of the brake device 40. However, when the change amount ΔV exceeds a certain value, there is a high probability that the subject vehicle velocity Vs was wrongly detected. Accordingly, when the change amount ΔV of the subject vehicle velocity Vs is greater than a predetermined value, the vehicle control ECU 20 calculates the current value of the subject vehicle velocity Vs based on the previous value of the subject vehicle velocity Vs and the guard value Thg. According to the foregoing configuration, the absolute velocity Va can be set to an appropriate value even when there is a high probability that the determination on the movement information about the target object Ob will be affected by a large decrease amount of the subject vehicle velocity Vs or the like.

The assumed activation amount is determined based on the maximum braking amount of the brake device 40. According to the foregoing configuration, the subject vehicle velocity Vs is calculated only when the change amount ΔV is equal to or greater than the maximum braking amount, which makes it possible to prevent the subject vehicle velocity from being changed unnecessarily. In addition, the subject vehicle velocity Vs can be calculated by a simple process in which the guard value Thg is fixed based on the maximum braking amount, which makes it possible to reduce the processing load on the vehicle control ECU 20.

The assumed activation amount of the brake device 40 also varies depending on the frictional force FF of the road surface on which the subject vehicle CS is running. Accordingly, the vehicle control ECU 20 acquires the frictional force FF of the road surface and sets the guard value Thg based on the acquired frictional force FF. According to the foregoing configuration, the absolute velocity of the target object Ob can be acquired with high accuracy by the assumed activation amount of the brake device 40 depending on the condition of the road surface on which the subject vehicle CS is running.

When the braking force of the brake device 40 becomes weakened due to decrease in the frictional force FF of the road surface, the locking of the wheels and a sudden change in the subject vehicle velocity is less likely to occur, thereby to reduce the frequency with which the subject vehicle velocity Vs is wrongly detected. Accordingly, the vehicle control ECU 20 changes the guard value Thg to a smaller value as the frictional force FF of the road surface becomes lower. According to the foregoing configuration, when there are fewer factors in wrongly detecting the subject vehicle velocity Vs, the vehicle control ECU 20 is less prone to change the subject vehicle velocity Vs, thereby allowing acquisition of the appropriate subject vehicle velocity.

In the case of manual braking by the driver, the subject vehicle is decelerated by the driver's braking operation, that is, as the reflection of the driver's intention, whereas in the case of automatic braking, the subject vehicle is decelerated regardless of the driver's braking operation. Accordingly, high detection accuracy is required in automatic braking that might cause wrong detection of the subject vehicle velocity, as compared to the case of manual braking by the driver. Accordingly, the vehicle control ECU includes automatic braking that automatically activates the brake device 40 as collision avoidance control. When it is determined that automatic braking is to be performed, the vehicle control ECU calculates the current value of the subject vehicle velocity Vs based on the previous subject vehicle velocity Vs and the guard value Thg. According to the foregoing configuration, even if the wrong detection of the subject vehicle velocity Vs is highly influential, appropriately setting the subject vehicle velocity Vs makes it possible to perform appropriate collision avoidance control on the target object Ob.

Second Embodiment

In a second embodiment, when the assumed activation amount (assumed braking force) of automatic braking in the PCS is changed, the guard value Thg is set based on each assumed activation amount.

Figure 5:
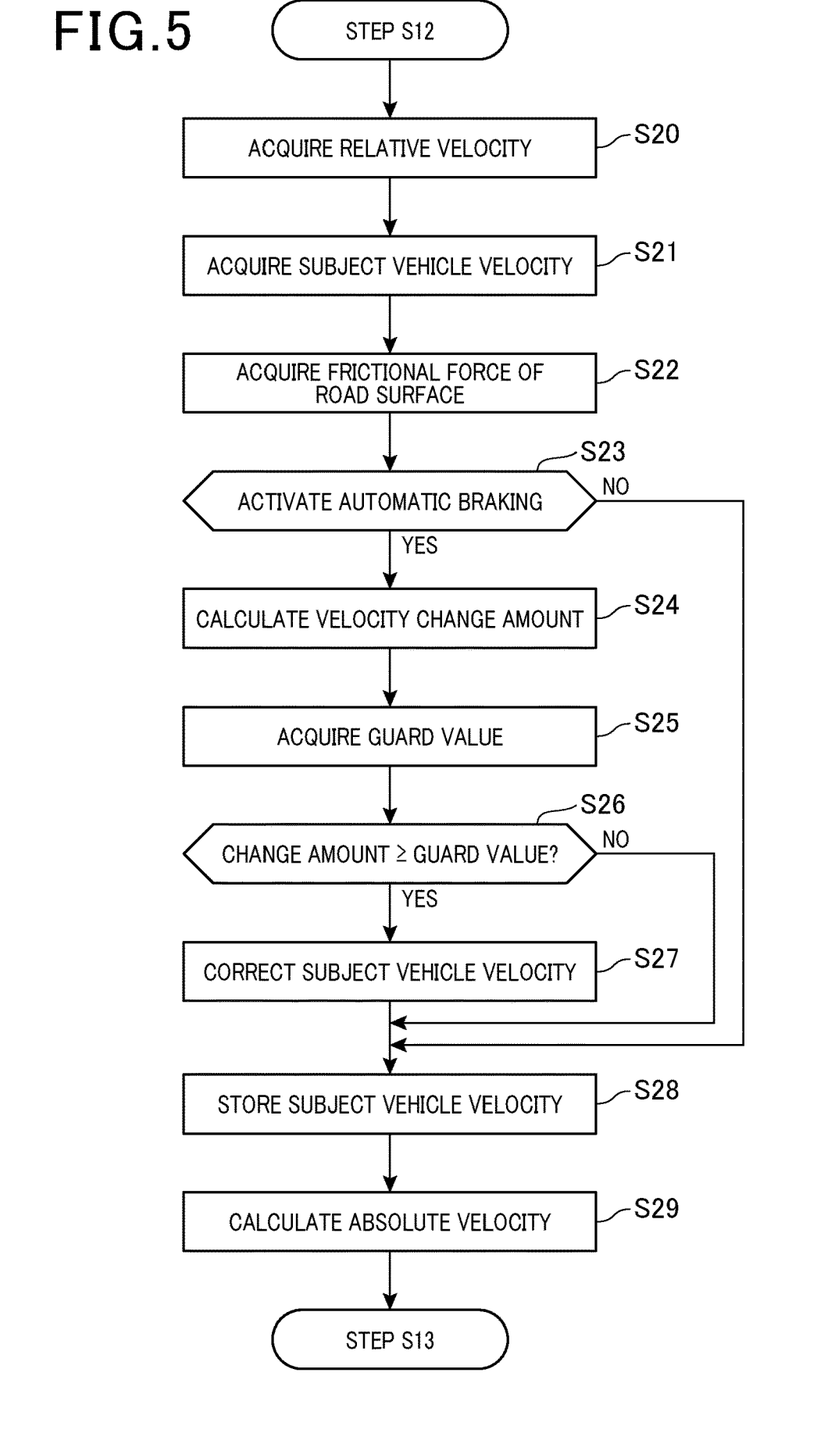
FIG. 5 is a flowchart of a method for acquiring an absolute velocity Va.
Figure 8:
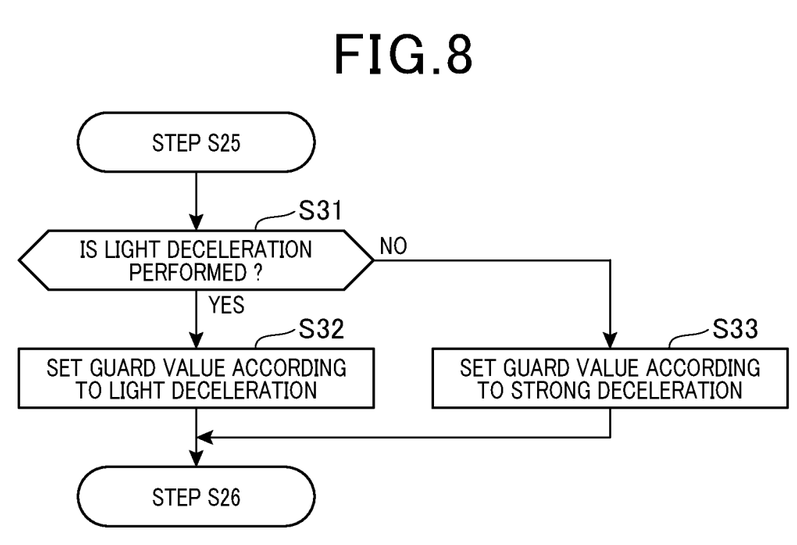
FIG. 8 is a flowchart of acquisition of a guard value Thg according to a second embodiment.

The process described in FIG. 8 is performed to acquire the guard value Thg in step S25 described in FIG. 5 in the second embodiment.

In step S31, it is determined whether automatic braking has been executed for light deceleration. For example, the vehicle control ECU 20 determines whether light deceleration or strong deceleration has requested to the brake device 40 according to the current TTC.

When automatic braking has been executed for light deceleration (step S31: YES), the vehicle control ECU 20 sets the guard value Thg according to the light deceleration in step S32 In this case, the assumed activation amount of the brake device 40 is lower than that in the case of strong deceleration, and thus the vehicle control ECU 20 sets the guard value Thg to a low value.

On the other hand, when automatic braking has been executed for strong deceleration (step S31: NO), the vehicle control ECU 20 sets the guard value Thg according to the strong deceleration in step S33.

When step S32 or S33 is completed, the process proceeds to step S26 described in FIG. 5. In step S26, the vehicle control ECU 20 uses the set guard value Thg to determine the change amount ΔV.

As described above, in the second embodiment, the vehicle control ECU 20 sets the assumed activation amount of automatic braking based on the TTC indicative of the time before a collision between the target object Ob and the subject vehicle CS. In addition, the vehicle control ECU 20 changes the assumed deceleration amount based on the assumed activation amount of automatic braking. According to the foregoing configuration, even when the assumed activation amount is changed in the collision avoidance control, the absolute velocity Va of the target object Ob can be appropriate calculated.

Other Embodiments

The foregoing embodiment may be modified as described below.

It is a mere example to calculate the subject vehicle velocity Vs based on the result of comparison between the change amount ΔV and the guard value Thg in step S26 described in FIG. 5. The vehicle control ECU 20 also includes another correction function for correction of the subject vehicle velocity Vs and may acquire the subject vehicle velocity Vs after correction by substituting the values of the subject vehicle velocity Vs acquired in step S21 and the assumed activation amount of the brake device 40 into the correction.

The subject vehicle velocity Vs may be calculated at the time of manual braking by the driver as well as at the time of automatic braking. In this case, in step S23 of FIG. 5, the vehicle control ECU 20 determines whether automatic braking has been executed by the PCS or manual braking has been executed by the driver. For example, the vehicle control ECU 20 determines whether the driver has performed the braking operation according to the output from the brake pedal sensor 34. When the antilock brake system (ABS) is activated at the time of manual braking by the driver, the vehicle control ECU 20 may set the guard value Thg taking the amount of activation of the brake device 40 by the ABS into account.

It is a mere example to calculate the frictional force FF of the road surface on which the subject vehicle CS is running by the use of slip ratio. When the subject vehicle CS includes a navigation system, the frictional force FF of the road surface may be acquired according to the information on the weather and the external temperature acquired by the navigation system.

The present disclosure has been described so far according to examples, but it is noted that the present disclosure is not limited to the foregoing examples or structures. The present disclosure includes various modifications and changes in a range of equivalency. In addition, various combinations and modes, as well as other combinations and modes, including those which include one or more additional elements, or those which include fewer elements should be considered to be in the scope and spirit of the present disclosure.

The invention claimed is:

1. A vehicle control device for a vehicle that calculates an absolute velocity of an object from a vehicle velocity and a relative velocity of the object, and performs collision avoidance control with respect to the object based on the absolute velocity, comprising:
   a brake determination unit configured to determine whether a brake device in the vehicle has been activated in a period during which the absolute velocity is calculated; and
   a calculation unit configured to, after activation of the brake device, calculate a current value of the vehicle velocity based on a previous value of the vehicle velocity and an assumed deceleration amount determined from an assumed activation amount that can be generated by the brake device.

2. The vehicle control device according to claim 1, wherein
   after the activation of the brake device, when an amount of decrease in the vehicle velocity from the previous value is larger than a predetermined value, the calculation unit calculates the current value of the vehicle velocity based on the previous value of the vehicle velocity and the assumed deceleration amount.

3. The vehicle control device according to claim 1, wherein
   the assumed activation amount is determined based on a maximum braking amount of the brake device.

4. The vehicle control device according to claim 1, further comprising an operation control unit configured to set the assumed activation amount of the brake device, wherein
   the calculation unit sets the assumed deceleration amount based on the assumed activation amount of the brake device that is set by the operation control unit.

5. The vehicle control device according to claim 1, further comprising:
   an acquisition unit configured to acquire frictional force of a road surface on which the vehicle is running; and
   a setting unit configured to set the assumed deceleration amount based on the frictional force that is acquired.

6. The vehicle control device according to claim 5, wherein
   the setting unit sets the assumed deceleration amount to a lower value as the frictional force has a lower value.

7. The vehicle control device according to claim 1, wherein
   the collision avoidance control includes automatic braking by which the brake device is automatically activated, and
   when it is determined that automatic braking has been executed, the calculation unit calculates the current value of the vehicle velocity based on the previous value of the vehicle velocity and the assumed deceleration amount.

8. A vehicle control method for a vehicle that is implemented by a processor for calculating an absolute velocity of an object based on a vehicle velocity and a relative velocity of the object and performing collision avoidance control with respect to the object based on the absolute velocity, comprising:
   a brake determination step of determining, using the processor, whether a brake device in the vehicle has been activating in a period during which the absolute velocity is calculated; and
   a calculation step of, after activation of the brake device, calculating, using the processor, a current value of the vehicle velocity based on a previous value of the vehicle velocity and an assumed deceleration amount determined from an assumed activation amount that can be generated by the brake device.

9. A vehicle control device for a vehicle that calculates an absolute velocity of an object from a vehicle velocity and a relative velocity of the object, and performs collision avoidance control with respect to the object based on the absolute velocity, comprising:
   a memory;
   a processor communicable to the memory; and
   a set of computer-executable instructions stored on the memory that cause the processor to implement:
      determining whether a brake device in the vehicle has been activating in a period during which the absolute velocity is calculated; and
      after activation of the brake device, calculating a current value of the vehicle velocity based on a previous value of the vehicle velocity and an assumed deceleration amount determined from an assumed activation amount that can be generated by the brake device.

* * * * *